(12) United States Patent
Zhang et al.

(10) Patent No.: US 10,606,757 B2
(45) Date of Patent: Mar. 31, 2020

(54) METHOD, DEVICE AND COMPUTER PROGRAM PRODUCT FOR FLUSHING METADATA IN MULTI-CORE SYSTEM

(71) Applicant: EMC IP Holding Company LLC, Hopkinton, MA (US)

(72) Inventors: Lester Zhang, Beijing (CN); Chen Gong, Beijing (CN); Brown Zan Liu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/173,131

(22) Filed: Oct. 29, 2018

(65) Prior Publication Data

US 2019/0332543 A1    Oct. 31, 2019

(30) Foreign Application Priority Data

Jan. 18, 2018  (CN) .......................... 2018 1 0050616

(51) Int. Cl.
| | |
|---|---|
| *G06F 12/00* | (2006.01) |
| *G06F 12/0891* | (2016.01) |
| *G06F 12/02* | (2006.01) |
| *G06F 16/907* | (2019.01) |
| *G06F 16/901* | (2019.01) |

(52) U.S. Cl.
CPC ...... *G06F 12/0891* (2013.01); *G06F 12/0238* (2013.01); *G06F 16/901* (2019.01); *G06F 16/907* (2019.01)

(58) Field of Classification Search
CPC .................................................. G06F 12/0891
See application file for complete search history.

(56) References Cited

U.S. PATENT DOCUMENTS

| | | | |
|---|---|---|---|
| 9,582,222 B2 * | 2/2017 | Yang ..................... | G06F 3/0611 |
| 9,779,438 B2 * | 10/2017 | Venkatesan .......... | G06Q 10/103 |
| 2010/0205227 A1 * | 8/2010 | Weissman ...... | G06Q 10/063112 707/803 |

* cited by examiner

*Primary Examiner* — Tammara R Peyton
(74) *Attorney, Agent, or Firm* — Ryan, Mason & Lewis, LLP

(57) ABSTRACT

Embodiments of the present disclosure provide a method, device and computer program product for flushing metadata in a multi-core system. The method comprises: moving a metadata identifier included in a sub-list of a first list to a corresponding sub-list of a second list, the sub-list of the first list and the corresponding sub-list of the second list being associated with the same processing unit; moving the metadata identifier from the corresponding sub-list of the second list to a third list based on a storage position of the metadata identifier; and determining metadata to be flushed from the third list to a metadata repository. By means of the method and device for flushing metadata as proposed in the present disclosure, metadata synchronization contention can be reduced, IO efficiency can be improved, response time can be decreased, and the cache hit can be increased.

20 Claims, 7 Drawing Sheets

*FIG. 1*

```
                    ┌──────────────────────────────────────────┐
                    │ REMOVING A METADATA IDENTIFIER INCLUDED  │
                    │ IN A SUB-LIST OF A FIRST LIST TO A       │
                    │ CORRESPONDING SUB-LIST OF A SECOND LIST, │──110
                    │ THE SUB-LIST OF THE FIRST LIST AND THE   │
                    │ CORRESPONDING SUB-LIST OF THE SECOND     │
                    │ LIST BEING ASSOCIATED WITH A SAME        │
                    │ PROCESSING UNIT                          │
                    └──────────────────────────────────────────┘
                                       │
                                       ▼
                    ┌──────────────────────────────────────────┐
                    │ REMOVING METADATA IDENTIFIERS FROM THE   │
                    │ CORRESPONDING SUB-LIST OF THE SECOND     │──120
                    │ LIST TO A THIRD LIST BASED ON A STORAGE  │
                    │ POSITION OF THE METADATA IDENTIFIERS     │
                    └──────────────────────────────────────────┘
                                       │
                                       ▼
                    ┌──────────────────────────────────────────┐
                    │ DETERMINING METADATA TO BE FLUSHED FROM  │──130
                    │ THE THIRD LIST TO A METADATA REPOSITORY  │
                    └──────────────────────────────────────────┘
```

METHOD, DEVICE AND COMPUTER PROGRAM PRODUCT FOR FLUSHING METADATA IN MULTI-CORE SYSTEM

RELATED APPLICATION(S)

The present application claims priority to Chinese Patent Application No. 201810050616.8, filed Jan. 18, 2018 and entitled "Method and Device for Flushing Metadata in a Multi-Core System and Computer Program Product," which is incorporated by reference herein in its entirety.

FIELD

Embodiments of the present disclosure generally relate to data storage, and more specifically, to a method, device and computer program product for flushing metadata in a multi-core system.

BACKGROUND

Traditional metadata frameworks use only two FIFO (first in first out) lists to perform metadata flushing. A first FIFO list is used to extract an identifier associated with metadata that records which metadata's FSBN (file system block number) has been changed. When synchronization is triggered, all identifiers in the first FIFO list will be removed to a second FIFO list. Metadata is flushed one by one according to identifiers in the second FIFO list. However, for a multi-core file system, such a method for flushing metadata leads to a bottleneck in the file system.

Since FIFO lists are only time based, an identifier buffer may extend to the entire file system's metadata address space and bring heavy pressure to the system. In addition, the current list design is not friendly to a multi-core system, because it leads to much unnecessary contention and conflict in the list space.

SUMMARY

Illustrative embodiments of the present disclosure provide a method, device and computer readable medium for flushing metadata in a multi-core system, so as to solve the problems in the prior art.

In a first aspect of the present disclosure, a method of flushing metadata is provided. The method comprises: removing a metadata identifier included in a sub-list of a first list to a corresponding sub-list of a second list, the sub-list of the first list and the corresponding sub-list of the second list being associated with the same processing unit; removing the metadata identifiers from the corresponding sub-list of the second list to a third list based on a storage position of the metadata identifier; and determining metadata to be flushed from the third list to a metadata repository.

In a second aspect of the present disclosure, a device for flushing metadata is provided. The device comprises: at least one processor; and a memory coupled to the at least one processor and comprising instructions stored thereon, the instructions, when executed by the at least one processor, causing the device to perform acts comprising removing a metadata identifier included in a sub-list of a first list to a corresponding sub-list of a second list, the sub-list of the first list and the corresponding sub-list of the second list being associated with the same processing unit; removing the metadata identifiers from the corresponding sub-list of the second list to a third list based on a storage position of the metadata identifier; and determining metadata to be flushed from the third list to a metadata repository.

In a third aspect of the present disclosure, a computer program product is provided. The computer program product is tangibly stored on a non-transient computer readable medium and comprises machine executable instructions which, when executed, cause a machine to perform steps of the above-noted method according to the first aspect of the present disclosure.

It should be appreciated that the above summary description and other description herein are not intended to limit key or important features of the embodiments of the present disclosure or used to limit the scope of the present disclosure. Other features of the present disclosure will become easier to understand from the following description.

BRIEF DESCRIPTION OF THE DRAWINGS

The above and other objects, features and advantages of various embodiments of the present disclosure will become apparent from the following detailed description, when taken in conjunction with the accompanying drawings in which several embodiments of the present disclosure are shown for illustrative purposes, rather than by way of limitation. Among the accompanying drawings, FIG. 1 shows a flowchart of a method 100 for flushing metadata according to the embodiments of the present disclosure;

Throughout the figures, the same or corresponding reference numerals denote the same or corresponding parts.

DETAILED DESCRIPTION

Figure 2:
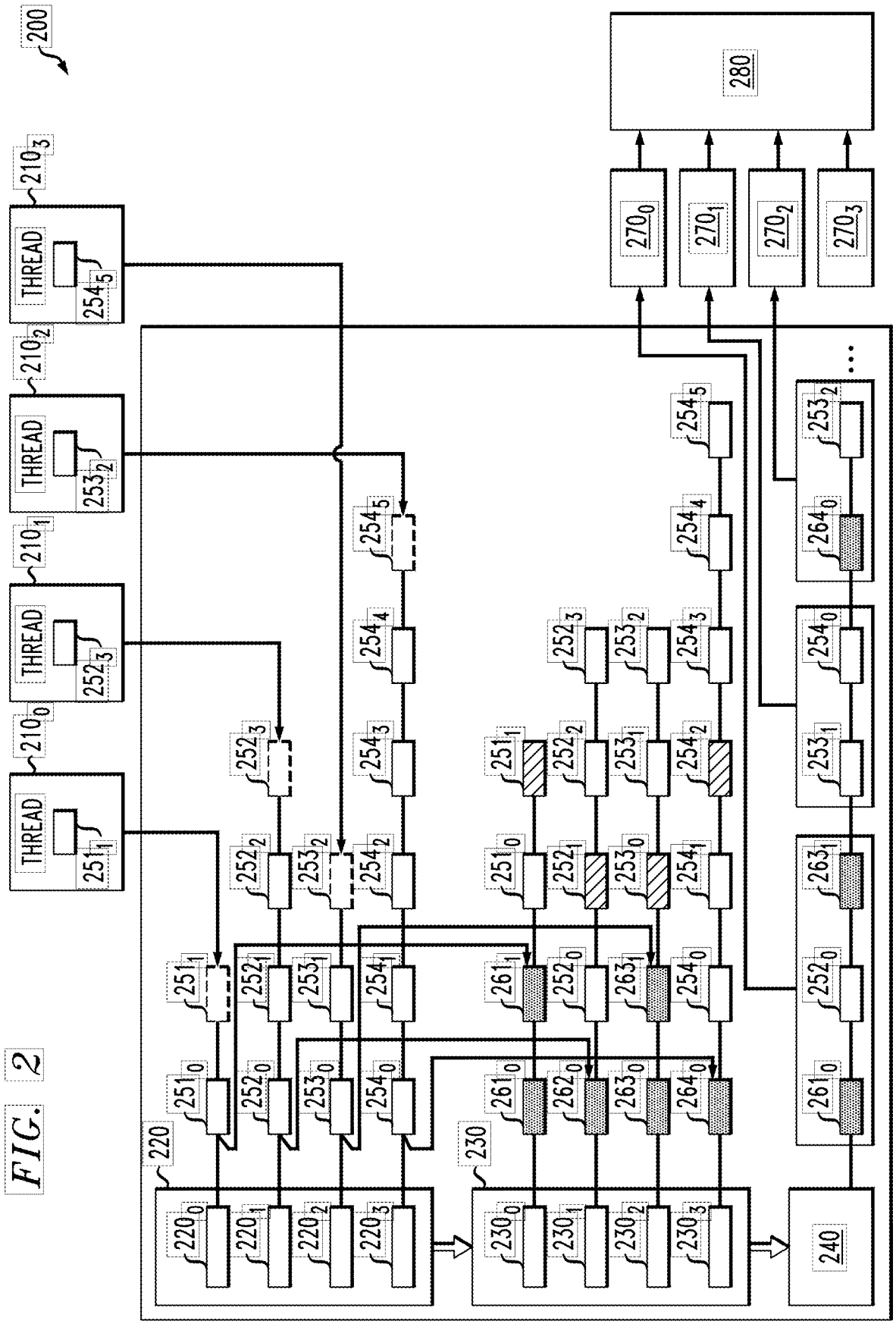
FIG. 2 shows a view of an architecture 200 for flushing metadata according to the embodiments of the present disclosure.
Figure 3:
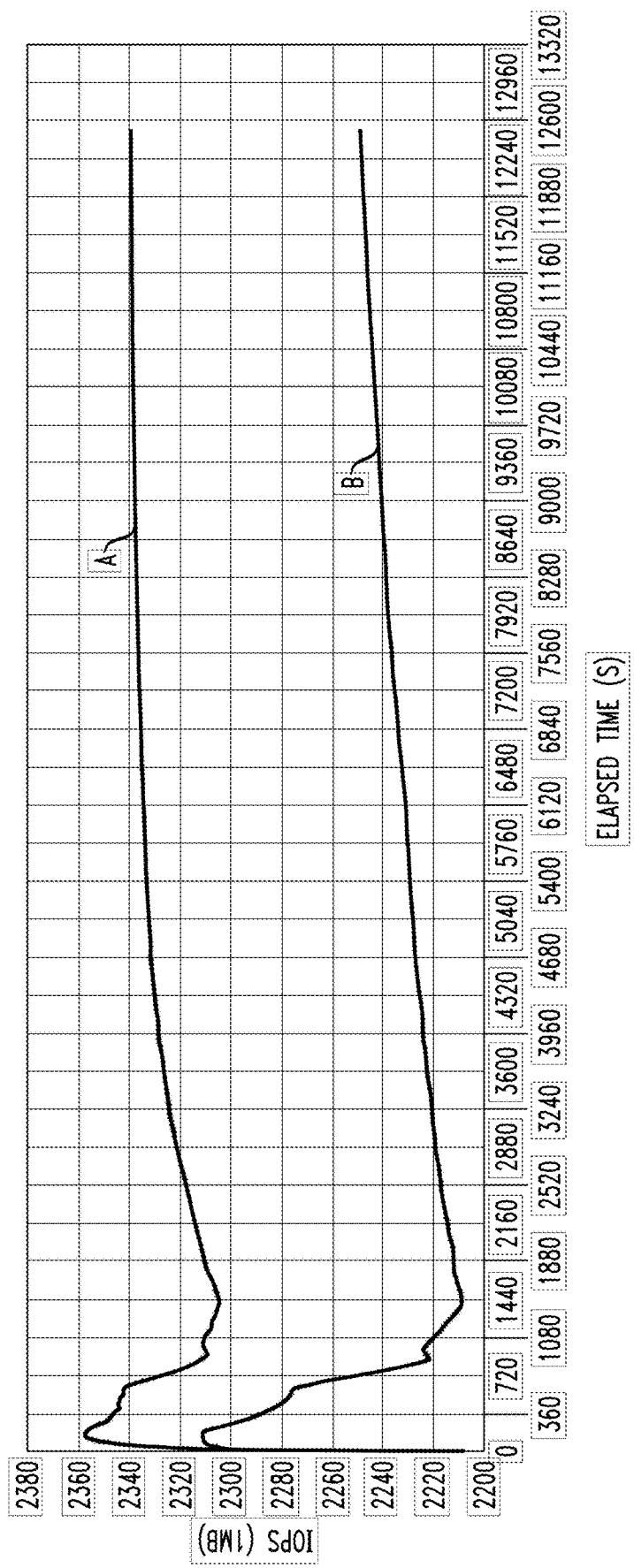
FIG. 3 shows a schematic view for testing a method for flushing metadata according to one embodiment of the present disclosure.
Figure 4:
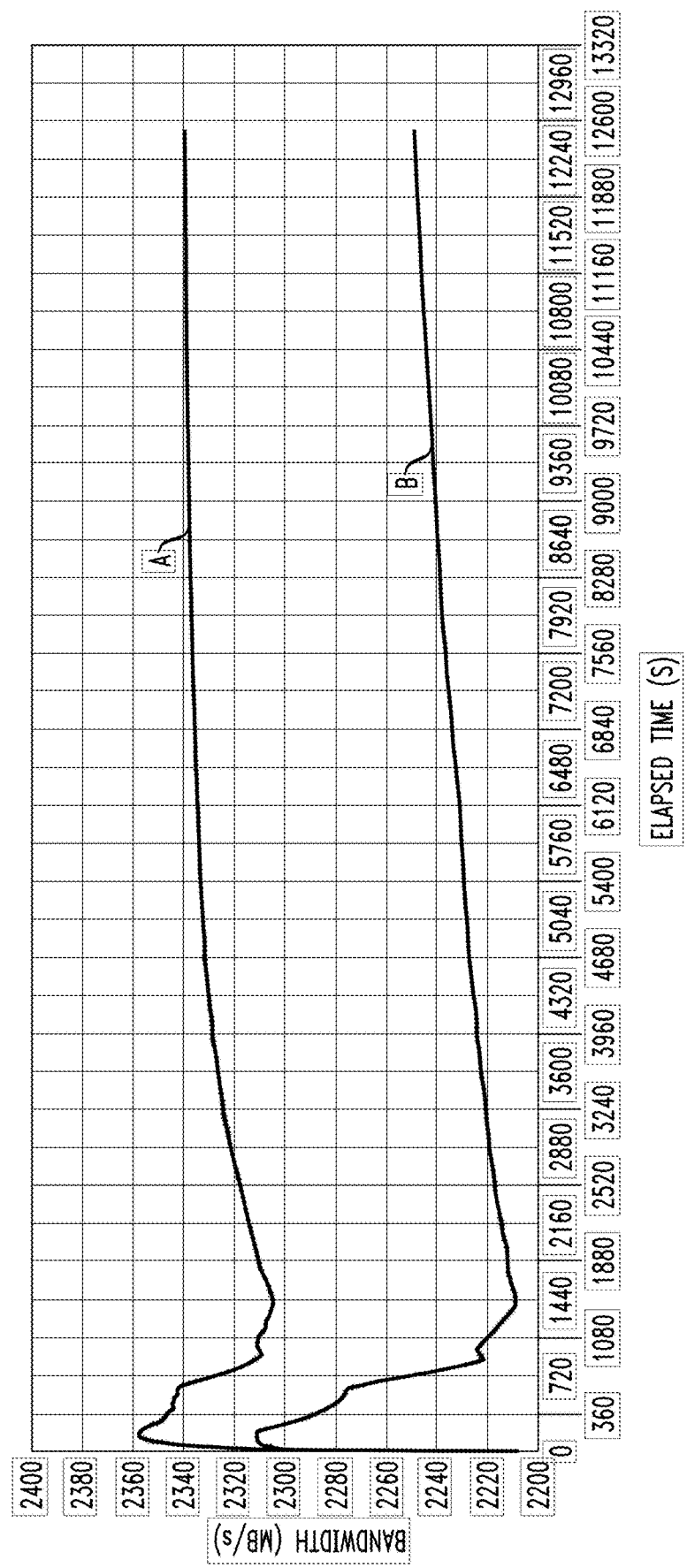
FIG. 4 shows a schematic view for testing a method for flushing metadata according to one embodiment of the present disclosure.
Figure 5:
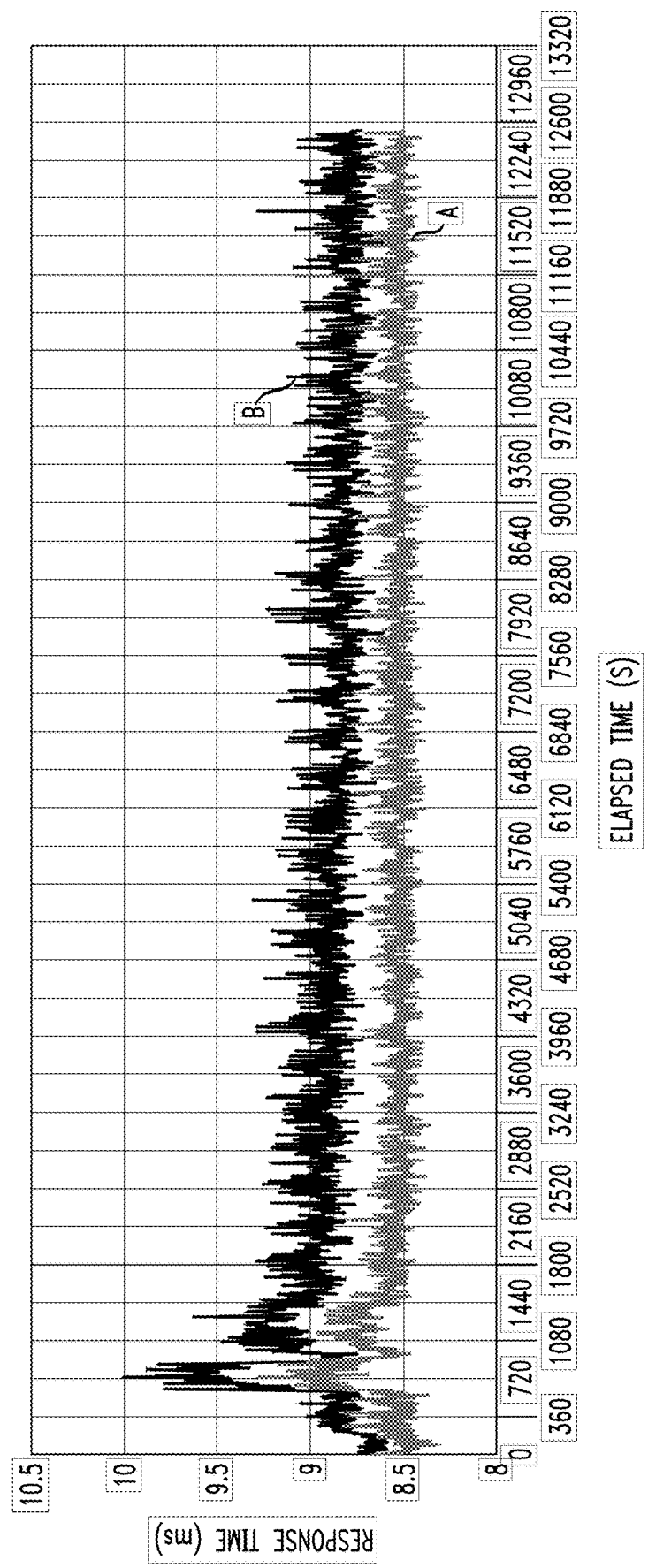
FIG. 5 shows a schematic view for testing a method for flushing metadata according to one embodiment of the present disclosure.
Figure 6:
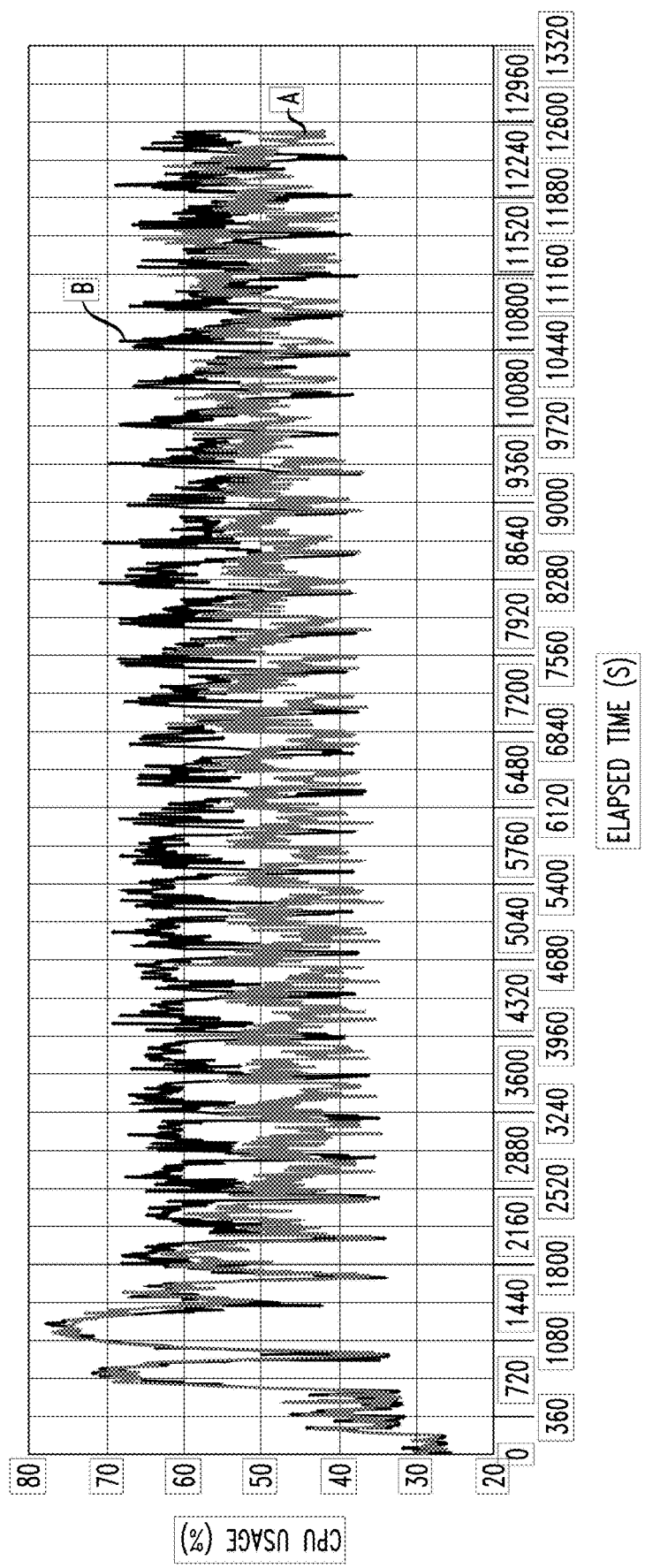
FIG. 6 shows a schematic view for testing a method for flushing metadata according to one embodiment of the present disclosure.

Various exemplary embodiments of the present disclosure will be described in more detail with reference to the accompanying drawings. It is noteworthy that these accompanying drawings and description merely relate to exemplary embodiments. Substitute embodiments of the structure and method disclosed herein may be easily devised according to the description below, and they may be applied without departing from the principles claimed in the present disclosure.

It should be appreciated that these exemplary embodiments are provided for enabling those skilled in the art to better understand and further implement the present disclosure, rather than limiting the scope of the present disclosure in any manner.

The terms "comprise," "include" and their variants used here are to be read as open terms that mean "include, but is not limited to." The term "based on" is to be read as "based at least in part on." The term "one embodiment" is to be read as "at least one embodiment;" the term "another embodiment" is to be read as "at least one other embodiment." Definitions of other terms will be presented in the description below.

Currently a file system has been divided into data and metadata. Data is pure user data and metadata is used to describe the data's attributes and structure in the file system. To keep metadata consistency, a log system has been introduced. When a user changes a file, usually the following steps are performed: 1. Change a data part; 2. Add a log item into the log system; 3. Respond to a user operation; 4. Flush metadata; 5. Clean a related log item.

It is apparent from the above that flushing metadata is a critical cycle of file system operation. A sub-system is configured to perform this operation. A used buffer identifier (dirty buffer hint) is used to record which metadata's FSBN (file system block number) has been changed and stored into a FIFO (first in first out) list. When the system is under log space pressure, cache pressure or some timer hits, the flush metadata operation will be triggered to clean related log items.

A flush job will be created and fetch an identifier associated with metadata to start synchronization work. To reduce concurrency, a current design uses two level lists: a first FIFO list and a second FIFO list. When a log item is added to the log system, an identifier associated with the metadata will be added into the first FIFO list. When synchronization is triggered, the flush job adds all identifiers in the first FIFO list to the second FIFO list and starts the metadata flush corresponding to each identifier one by one.

Since FIFO lists are only time based, identifiers associated with metadata might spread around the metadata address space of a whole file system and bring heavy pressure to the system. In addition, the current list design is not friendly enough to a multi-core system, because it leads to much unnecessary contention and conflict in the list space.

To solve the foregoing and other potential problems, illustrative embodiments of the present disclosure propose a solution for alleviating system pressure caused by metadata to be flushed in a multi-core file system. The method and device for flushing metadata as proposed by the present disclosure can reduce metadata synchronization contention, significantly improving IO efficiency and decrease response time. In addition, the method can increase the likelihood of cache hits.

FIG. 1 shows a flowchart of a method 100 for flushing metadata according to an illustrative embodiment of the present disclosure. FIG. 2 shows a view of an architecture 200 for flushing metadata according to an illustrative embodiment of the present disclosure.

Before describing block 110 of the method 100 shown in FIG. 1, the architecture 200 for flushing metadata will be described with reference to FIG. 2. Threads $210_0$, $210_1$, $210_2$ and $210_3$ are shown in FIG. 2 and may be construed as operations run by different cores (referred to as "processing units" below). In the embodiment shown in FIG. 2, the operation refers to a flush metadata operation. For example, the thread $210_0$ may be an operation performed by a first processing unit, and the thread $210_3$ may be an operation performed by a fourth processing unit.

When the file system is to flush metadata, information indicating which metadata's FSBN has been changed will be recorded to an identifier, e.g. one or more instances of identifiers specified at least in part using reference numerals 251, 252, 253, 254, 261, 262, 263 or 264 in FIG. 2. When the processing unit executes an operation for flushing metadata, the identifier associated with metadata will be inserted into a list, e.g. a first list 220 in FIG. 2. The first list 220 is arranged to fetch an identifier of metadata. To prevent various processing units from contending for space in the first list 220, the first list 220 is divided into several sub-lists (percorelist). For example, the number of the sub-lists may correspond to the number of the processing units one by one. As shown in FIG. 2, the first list 220 comprises sub-lists $220_0$, $220_1$, $220_2$ and $220_3$, which may be a first list of the first processing unit, the second processing unit, the third processing unit and the fourth processing unit respectively. Thereby, the thread $210_0$ executed on the first processing unit inserts a metadata identifier $251_1$ into the sub-list $220_0$ of the first list 220. FIG. 2 shows all identifiers using reference numerals 251, 252, 253 and 254 that are added by the threads $210_0$, $210_1$, $210_2$ and $210_3$ to the sub-lists $220_0$, $220_1$, $220_2$ and $220_3$ of the first list 220.

FIG. 2 further shows a second list 230 and a third list 240 for receiving metadata identifiers. It may be seen that the second list 230 comprises sub-lists $230_0$, $230_1$, $230_2$ and $230_3$ corresponding to the sub-lists $220_0$, $220_1$, $220_2$ and $220_3$ of the first list 220. Illustration is continued below with reference to the flowchart of the method 100 for flushing metadata according to the embodiments of the present disclosure as shown in FIG. 1.

With reference to FIG. 1, in block 110, a metadata identifier included in the sub-list $220_0$ of the first list 220 is removed to the corresponding sub-list $230_0$ of the second list, and both the sub-list $220_0$ of the first list 220 and the sub-list $230_0$ of the second list 230 are associated with the same processing unit. It should be appreciated that for other sub-lists of the first list 220, they are subject to the same remove operation, i.e. they are removed to corresponding sub-lists of the second list 230 respectively. A sub-list of the first list 220 and a corresponding sub-list of the second list 230 are both associated with the same processing unit. After the remove operation, all identifiers in the first list 220 will be removed to the second list 230.

In some embodiments, the foregoing remove operation may be executed when some trigger conditions are satisfied. The trigger conditions may comprise at least one of the following: a utilization efficiency of a log system recording metadata flushes exceeds a first threshold, a utilization efficiency of a cache associated with metadata exceeds a second threshold, and a predefined time interval is reached.

Next in block 120, metadata identifiers are removed to the third list 240 from the corresponding sub-lists $230_0$, $230_1$, $230_2$ and $230_3$ of the second list 230 based on storage positions of the metadata identifiers.

As seen from FIG. 2, except those removed from the first list 220 to the third list 230, some identifiers remain in the third list 230 between metadata flush cycles, such as $261_0$ (these remaining identifiers are shown by blocks filled with dots in FIG. 2).

Here a storage position of the metadata identifier may be construed as a logical position. The logical position corresponds to a write sequence of log items in the log system, i.e. record numbers (UFSLOG record number) that are sorted in time sequence of writing to the log system. Hence, the metadata identifier records a logical position where its corresponding log item is written into the log system.

On the one hand, the operation of removing metadata identifiers to the third list 240 from the corresponding sub-lists $230_0$, $230_1$, $230_2$ and $230_3$ of the second list 230 follow FIFO principles. The flush sequence may be obtained from the write sequence of a corresponding log item in the log system. On the other hand, the number of identifiers removed to the third list 240 should satisfy needs of the cache associated with metadata. That is, once an identifier is removed to the third list 240 to flush metadata associated with the identifier, pressure can be alleviated after the flush cycle. This is construed as the cache's utilization efficiency being reduced.

In some embodiments, the number of the metadata identifiers to be removed to the third list 240 is determined according to a utilization efficiency of a cache associated with metadata, so that the number of identifiers removed to the third list 240 satisfies the need for alleviating use pressure on the cache associated with metadata. A predefined flush sequence of the metadata is obtained from the log system, so that the metadata identifiers removed to the third list can be determined based on the predefined flush sequence of the metadata and the number.

As mentioned above, the metadata identifiers removed from the second list 230 to the third list 240 should satisfy needs of both the log system and the cache associated with the metadata. The needs may be construed as the number of log items and caches to be cleaned in one flush cycle, which may be determined by the file system according to the use situation of the log system and the cache respectively. However, the two needs should be satisfied simultaneously, i.e. the need for cleaning caches of metadata defines the number of the metadata identifiers removed from the second list 230 to the third list 240. Log items to be cleaned in the log system also should correspond to the number of the identifiers. If log items to be cleaned are more than the number of caches to be cleaned, then the metadata identifier removed from the second list 230 to the third list 240 may be directly determined from the identifier corresponding to the write position of the log item. If log items to be cleaned are less than the number of caches to be cleaned, then log items may be expanded at a predefined unit utilization efficiency of the log system, for example 1%, until log items to be cleaned in the log system satisfy the number of caches to be cleaned. Then, the metadata identifier removed from the second list 230 to the third list 240 may be directly determined from the identifier corresponding to the write position of the log item.

Therefore, in some embodiments, the number of metadata to be flushed first are determined based on the predefined flush sequence of the metadata, and metadata identifiers corresponding to the determined metadata are determined as the metadata identifiers to be removed to the third list. For example, a block filled with dashes in FIG. 2 represents a critical identifier (e.g. an identifier $251_1$) determined on each sub-list of the second list, i.e. in the sub-list all identifiers before the critical identifier should be moved to the third list 240. Still with reference to FIG. 1, in block 130 metadata to be flushed to a metadata repository is determined from the third list.

As mentioned above, the metadata identifier records a logical position in the log system to where its corresponding log item will be written. In some embodiments, a predefined flush sequence of metadata may be obtained from the identifier, that is, the predefined flush sequence of the metadata may be obtained from the log system. Based on the flush sequence (i.e. logical position on the log system), metadata in the third list is grouped. One or more identifiers that are adjacent or have adjacent logical positions in the log system may fall into the same group. For example, in FIG. 2 identifiers $261_0$, $252_0$ and $263_1$ fall into the same group. After the grouping, metadata corresponding to each group of metadata identifiers may be flushed to a metadata repository 280. Therefore, the flush task may proceed concurrently according to multiple threads $270_0$, $270_1$, $270_2$ and $270_3$, so that each thread flushes one batch of metadata.

FIGS. 3 to 6 show, from different aspects, improvement of system performance brought about by a method for flushing metadata according to the embodiments of the present disclosure. In FIGS. 3 to 6, reference letter A represents a result curve of a system performance test using a prior solution, and reference letter B represents a result curve of a system performance test using a method according to the embodiments of the present disclosure. As seen from FIGS. 3 to 6, after executing the method according to the embodiments of the present invention, IOPS (input/output per second) or reads/writes per second and bandwidth are improved significantly, while the system response time and the CPU utilization efficiency are decreased greatly.

Figure 7:
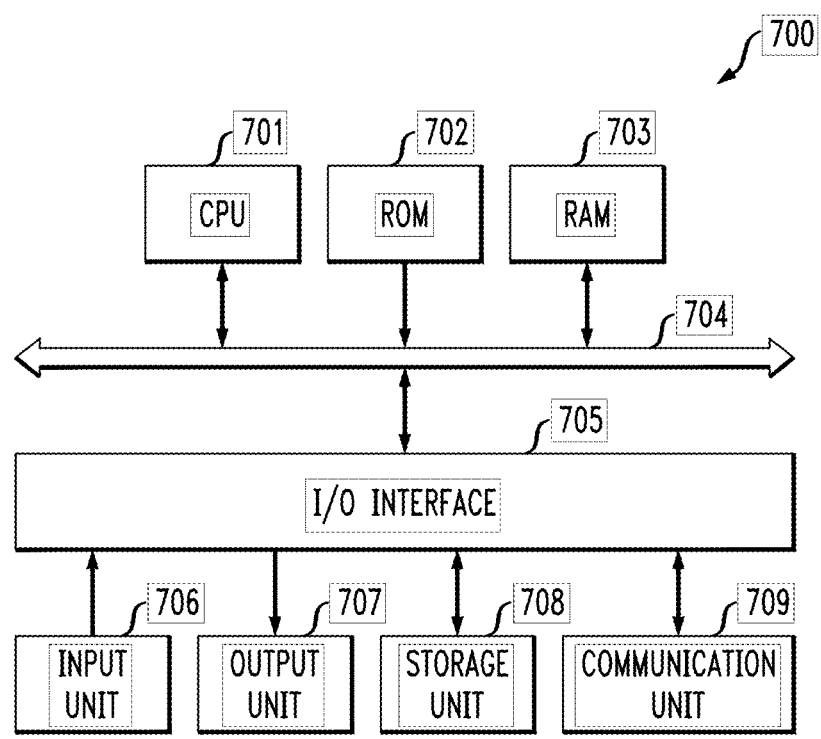
FIG. 7 shows a schematic block diagram of a device 700 suitable to implement the embodiments of the present disclosure.

FIG. 7 shows a schematic block diagram of a device 700 suitable for implementing the embodiments of the present disclosure. As depicted, the device 700 comprises a central processing unit (CPU) 701 which is capable of performing various appropriate actions and processes in accordance with computer program instructions stored in a read only memory (ROM) 702 or computer program instructions loaded from a storage unit 708 to a random access memory (RAM) 703. In the RAM 703, there are also stored various programs and data required by the device 700 when operating. The CPU 701, the ROM 702 and the RAM 703 are connected to one another via a bus 704. An input/output (I/O) interface 705 is also connected to the bus 704.

Multiple components in the device 700 are connected to the I/O interface 705: an input unit 706 including a keyboard, a mouse, or the like; an output unit 707, such as various types of displays, a loudspeaker or the like; a storage unit 708, such as a disk, an optical disk or the like; and a communication unit 709, such as a LAN card, a modem, a wireless communication transceiver or the like. The communication unit 709 allows the device 700 to exchange information/data with other devices via a computer network, such as the Internet, and/or various telecommunication networks.

The above-described procedures and processes, such as the method 100, may be executed by the processing unit 701. For example, in some embodiments, the method 100 may be implemented as a computer software program, which is tangibly embodied on a machine readable medium, e.g. the storage unit 708. In some embodiments, part or the entirety of the computer program may be loaded to and/or installed on the device 700 via the ROM 702 and/or the communication unit 709. The computer program, when loaded to the RAM 703 and executed by the CPU 701, may execute one or more steps of the method 100 as described above.

Some embodiments of the present disclosure further provide a method for establishing multilevel flash cache by using a spare disk. As compared with the prior art, such embodiments of the present disclosure can utilize all types of spare disks to establish assistant cache, thereby making effective use of spare disks. In this manner, a larger cache capacity can be provided to the cache. In addition, the write I/O requests caused by flushing the page flushed to the hard disk to the flash disk could be reduced, so the total service life of the flash disk of the main cache can be extended.

The present disclosure may be a method, an apparatus, a system, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of flushing metadata, comprising:
   removing a metadata identifier included in a sub-list of a first list to a corresponding sub-list of a second list, the sub-list of the first list and the corresponding sub-list of the second list being associated with the same processing unit;
   removing the metadata identifiers from the corresponding sub-list of the second list to a third list based on a storage position of the metadata identifier; and
   determining metadata to be flushed from the third list to a metadata repository;
   wherein removing the metadata identifiers from the corresponding sub-list of the second list to a third list comprises determining metadata identifiers to be removed to the third list based on at least one of a utilization efficiency of a cache associated with metadata and a predefined flush sequence of the metadata.

2. The method according to claim 1, wherein removing a metadata identifier to a corresponding sub-list of a second list comprises:
   in response to at least one of a plurality of trigger conditions being satisfied, removing the metadata identifier included in a sub-list of a first list to a corresponding sub-list of a second list, the trigger conditions comprising:
      a utilization efficiency of a log system for recording metadata flushes exceeding a first threshold;
      a utilization efficiency of a cache associated with metadata exceeding a second threshold; and
      a predefined time interval being reached.

3. The method according to claim 1, wherein removing the metadata identifiers from the corresponding sub-list of the second list to a third list comprises:
   determining a number of metadata identifiers to be removed to the third list according to a utilization efficiency of a cache associated with metadata;
   obtaining a predefined flush sequence of the metadata from a log system for recording metadata flushes; and
   determining the metadata identifiers to be removed to the third list based on the predefined flush sequence of the metadata and the number.

4. The method according to claim 3, wherein determining the metadata identifiers to be removed to the third list comprises:
   determining the number of metadata to be flushed first based on the predefined flush sequence of the metadata; and
   determining the metadata identifiers corresponding to the determined metadata as the metadata identifiers to be removed to the third list.

5. The method according to claim 1, wherein determining metadata to be flushed from the third list to a metadata repository comprises:
   obtaining a predefined flush sequence of the metadata from a log system for recording metadata flushes; and
   grouping the metadata identifiers in the third list based on the predefined flush sequence of the metadata, each group of metadata identifiers comprising one or more metadata identifiers, metadata corresponding to the one or more metadata identifiers having a predefined flush sequence within a threshold range; and
   flushing metadata corresponding to each group of metadata identifiers to the metadata repository.

6. A device for flushing metadata, comprising:
   at least one processor; and
   a memory coupled to the at least one processor and comprising instructions stored thereon, the instructions, when executed by the at least one processor, causing the device to perform acts comprising:
      removing a metadata identifier included in a sub-list of a first list to a corresponding sub-list of a second list, the sub-list of the first list and the corresponding sub-list of the second list being associated with the same processing unit;
      removing the metadata identifiers from the corresponding sub-list of the second list to a third list based on a storage position of the metadata identifier; and
      determining metadata to be flushed from the third list to a metadata repository;
      wherein removing the metadata identifiers from the corresponding sub-list of the second list to a third list comprises determining metadata identifiers to be removed to the third list based on at least one of a utilization efficiency of a cache associated with metadata and a predefined flush sequence of the metadata.

7. The device according to claim 6, wherein removing a metadata identifier to a corresponding sub-list of a second list comprises:
   in response to at least one of a plurality of trigger conditions being satisfied, removing the metadata identifier included in a sub-list of a first list to a corresponding sub-list of a second list, the trigger conditions comprising:
      a utilization efficiency of a log system for recording metadata flushes exceeding a first threshold;
      a utilization efficiency of a cache associated with metadata exceeding a second threshold; and
      a predefined time interval being reached.

8. The device according to claim 6, wherein removing the metadata identifier from the corresponding sub-list of the second list to a third list comprises:
   determining the a number of metadata identifiers to be removed to the third list according to a utilization efficiency of a cache associated with metadata;
   obtaining a predefined flush sequence of the metadata from a log system for recording metadata flushes; and
   determining the metadata identifier to be removed to the third list based on the predefined flush sequence of the metadata and the number.

9. The device according to claim 8, wherein determining the metadata identifiers to be removed to the third list comprises:
   determining the number of metadata to be flushed first based on the predefined flush sequence of the metadata; and
   determining the metadata identifiers corresponding to the determined metadata as the metadata identifiers to be removed to the third list.

10. The device according to claim 6, wherein determining metadata to be flushed from the third list to a metadata repository comprises:
   obtaining a predefined flush sequence of the metadata from a log system for recording metadata flushes; and
   grouping the metadata identifiers in the third list based on the predefined flush sequence of the metadata, each group of metadata identifiers comprising one or more metadata identifiers, metadata corresponding to the one or more metadata identifiers having a predefined flush sequence within a threshold range; and flushing metadata corresponding to each group of metadata identifiers to the metadata repository.

11. A computer program product being tangibly stored on a non-transient computer readable medium and comprising machine executable instructions which, when executed, cause a machine to perform steps of:

removing a metadata identifier included in a sub-list of a first list to a corresponding sub-list of a second list, the sub-list of the first list and the corresponding sub-list of the second list being associated with the same processing unit;

removing the metadata identifiers from the corresponding sub-list of the second list to a third list based on a storage position of the metadata identifier; and determining metadata to be flushed from the third list to a metadata repository;

wherein removing the metadata identifiers from the corresponding sub-list of the second list to a third list comprises determining metadata identifiers to be removed to the third list based on at least one of a utilization efficiency of a cache associated with metadata and a predefined flush sequence of the metadata.

12. The computer program product according to claim 11, wherein removing a metadata identifier to a corresponding sub-list of a second list comprises:

in response to at least one of a plurality of trigger conditions being satisfied, removing the metadata identifier included in a sub-list of a first list to a corresponding sub-list of a second list, the trigger conditions comprising:

a utilization efficiency of a log system for recording metadata flushes exceeding a first threshold;

a utilization efficiency of a cache associated with metadata exceeding a second threshold; and a predefined time interval being reached.

13. The computer program product according to claim 11, wherein removing the metadata identifiers from the corresponding sub-list of the second list to a third list comprises:

determining a number of metadata identifiers to be removed to the third list according to a utilization efficiency of a cache associated with metadata;

obtaining a predefined flush sequence of the metadata from a log system for recording metadata flushes; and determining the metadata identifiers to be removed to the third list based on the predefined flush sequence of the metadata and the number.

14. The computer program product according to claim 13, wherein determining the metadata identifiers to be removed to the third list comprises:

determining the number of metadata to be flushed first based on the predefined flush sequence of the metadata; and determining the metadata identifiers corresponding to the determined metadata as the metadata identifiers to be removed to the third list.

15. The computer program product according to claim 11, wherein determining metadata to be flushed from the third list to a metadata repository comprises:

obtaining a predefined flush sequence of the metadata from a log system for recording metadata flushes; and grouping the metadata identifiers in the third list based on the predefined flush sequence of the metadata, each group of metadata identifiers comprising one or more metadata identifiers, metadata corresponding to the one or more metadata identifiers having a predefined flush sequence within a threshold range; and flushing metadata corresponding to each group of metadata identifiers to the metadata repository.

16. The computer program product of claim 11 wherein said same processing unit comprises a first one of a plurality of processing cores of a multi-core system and wherein each of one or more other processing units comprises a different one of the plurality of processing cores of the multi-core system.

17. The computer program product of claim 16 wherein the first list comprises a plurality of sub-lists corresponding to respective ones of the processing units that comprise respective processing cores of the multi-core system, and further wherein the second list comprises a plurality of sub-lists corresponding to respective ones of the sub-lists of the first list.

18. The method of claim 1 wherein said same processing unit comprises a first one of a plurality of processing cores of a multi-core system and wherein each of one or more other processing units comprises a different one of the plurality of processing cores of the multi-core system.

19. The method of claim 18 wherein the first list comprises a plurality of sub-lists corresponding to respective ones of the processing units that comprise respective processing cores of the multi-core system, and further wherein the second list comprises a plurality of sub-lists corresponding to respective ones of the sub-lists of the first list.

20. The device of claim 6 wherein said same processing unit comprises a first one of a plurality of processing cores of a multi-core system and wherein each of one or more other processing units comprises a different one of the plurality of processing cores of the multi-core system.

* * * * *